(12) United States Patent
Krikorian et al.

(10) Patent No.: US 9,131,253 B2
(45) Date of Patent: Sep. 8, 2015

(54) SELECTION AND PRESENTATION OF CONTEXT-RELEVANT SUPPLEMENTAL CONTENT AND ADVERTISING

(75) Inventors: Jason Krikorian, Woodside, CA (US); Blake Krikorian, Hillsborough, CA (US); Brian Meckler, Kensington, CA (US)

(73) Assignee: Sling Media, Inc., Foster City, CA (US)

( * ) Notice: Subject to any disclaimer, the term of this patent is extended or adjusted under 35 U.S.C. 154(b) by 0 days.

(21) Appl. No.: 12/827,964

(22) Filed: Jun. 30, 2010

(65) Prior Publication Data

US 2010/0269138 A1 Oct. 21, 2010

Related U.S. Application Data

(63) Continuation of application No. 11/683,862, filed on Mar. 8, 2007, now Pat. No. 7,769,756, and a continuation-in-part of application No. 11/147,664, filed on Jun. 7, 2005, now Pat. No. 7,877,776.

(60) Provisional application No. 60/780,709, filed on Mar. 8, 2006, provisional application No. 60/577,833, filed on Jun. 7, 2004.

(51) Int. Cl.
*G06F 17/30* (2006.01)
*H04N 21/236* (2011.01)
(Continued)

(52) U.S. Cl.
CPC .... *H04N 21/23614* (2013.01); *H04L 29/06027* (2013.01); *H04L 65/4076* (2013.01); *H04L 65/4092* (2013.01); *H04L 65/602* (2013.01); *H04L 65/607* (2013.01);
(Continued)

(58) Field of Classification Search
CPC .................................................. G06F 17/30017
USPC .................................... 707/706, 736; 725/135
See application file for complete search history.

(56) References Cited

U.S. PATENT DOCUMENTS 5,132,992 A 7/1992 Yurt et al.
5,293,357 A 3/1994 Hallenbeck
(Continued)

FOREIGN PATENT DOCUMENTS

CA 2286641 A1 10/1998
CA 2324856 A1 5/2001
(Continued)

OTHER PUBLICATIONS

Australian Government "Notice of Acceptance" mailed Aug. 10, 2011; Patent Appln. No. 2006240518.
(Continued)

*Primary Examiner* — Noosha Arjomandi
(74) *Attorney, Agent, or Firm* — Ingrassia Fisher & Lorenz, P.C.

(57) ABSTRACT

Media content is paired with context-relevant supplemental content, and the media and supplemental content are provided to a user. A media stream containing the media content may be received from a source system, and context information about the media content is determined from information about the media stream. The supplemental content may be selected based on the determined context information. This may enable a business model in which third parties can register advertising or other supplemental content and specify the criteria that cause it to be combined with the media content.

9 Claims, 3 Drawing Sheets

(51) Int. Cl.

| | |
|---|---|
| *H04L 29/06* | (2006.01) |
| *H04N 21/234* | (2011.01) |
| *H04N 21/235* | (2011.01) |
| *H04N 21/2362* | (2011.01) |
| *H04N 21/258* | (2011.01) |
| *H04N 21/432* | (2011.01) |
| *H04N 21/433* | (2011.01) |
| *H04N 21/435* | (2011.01) |
| *H04N 21/436* | (2011.01) |
| *H04N 21/438* | (2011.01) |
| *H04N 21/44* | (2011.01) |
| *H04N 21/4402* | (2011.01) |
| *H04N 21/63* | (2011.01) |
| *H04N 21/6587* | (2011.01) |
| *H04N 21/81* | (2011.01) |
| *H04N 21/8405* | (2011.01) |
| *H04N 21/858* | (2011.01) |
| *H04N 19/172* | (2014.01) |
| *H04N 19/102* | (2014.01) |
| *H04N 19/115* | (2014.01) |
| *H04N 19/61* | (2014.01) |
| *H04N 19/107* | (2014.01) |
| *H04N 19/117* | (2014.01) |
| *H04N 19/132* | (2014.01) |
| *H04N 19/14* | (2014.01) |
| *H04N 19/137* | (2014.01) |
| *H04N 19/152* | (2014.01) |
| *H04N 19/162* | (2014.01) |
| *H04N 19/164* | (2014.01) |
| *H04N 19/182* | (2014.01) |
| *H04N 19/80* | (2014.01) |
| *H04N 19/85* | (2014.01) |
| *H04N 19/40* | (2014.01) |
| *H04N 19/169* | (2014.01) |
| *H04H 60/80* | (2008.01) |

(52) U.S. Cl.
CPC .......... *H04N 19/102* (2014.11); *H04N 19/107* (2014.11); *H04N 19/115* (2014.11); *H04N 19/117* (2014.11); *H04N 19/132* (2014.11); *H04N 19/137* (2014.11); *H04N 19/14* (2014.11); *H04N 19/152* (2014.11); *H04N 19/162* (2014.11); *H04N 19/164* (2014.11); *H04N 19/172* (2014.11); *H04N 19/182* (2014.11); *H04N 19/188* (2014.11); *H04N 19/40* (2014.11); *H04N 19/61* (2014.11); *H04N 19/80* (2014.11); *H04N 19/85* (2014.11); *H04N 21/235* (2013.01); *H04N 21/2362* (2013.01); *H04N 21/23406* (2013.01); *H04N 21/25891* (2013.01); *H04N 21/435* (2013.01); *H04N 21/4325* (2013.01); *H04N 21/4331* (2013.01); *H04N 21/4383* (2013.01); *H04N 21/4384* (2013.01); *H04N 21/43615* (2013.01); *H04N 21/4402* (2013.01); *H04N 21/44004* (2013.01); *H04N 21/632* (2013.01); *H04N 21/6587* (2013.01); *H04N 21/812* (2013.01); *H04N 21/8405* (2013.01); *H04N 21/8586* (2013.01); *H04H 60/80* (2013.01)

(56) References Cited

U.S. PATENT DOCUMENTS

| | | | |
|---|---|---|---|
| 5,321,846 | A | 6/1994 | Yokota et al. |
| 5,377,332 | A | 12/1994 | Entwistle et al. |
| 5,537,530 | A | 7/1996 | Edgar et al. |
| 5,708,961 | A | 1/1998 | Hylton et al. |
| 5,822,537 | A | 10/1998 | Katseff et al. |
| 5,850,482 | A | 12/1998 | Meany et al. |
| 5,852,437 | A | 12/1998 | Wugofski |
| 5,898,679 | A | 4/1999 | Brederveld et al. |
| 5,969,764 | A | 10/1999 | Sun et al. |
| 5,987,501 | A | 11/1999 | Hamilton et al. |
| 6,023,233 | A | 2/2000 | Craven et al. |
| 6,044,396 | A | 3/2000 | Adams |
| 6,097,441 | A | 8/2000 | Allport |
| 6,223,211 | B1 | 4/2001 | Hamilton et al. |
| 6,240,459 | B1 | 5/2001 | Roberts et al. |
| 6,263,503 | B1 | 7/2001 | Margulis |
| 6,279,029 | B1 | 8/2001 | Sampat et al. |
| 6,289,485 | B1 | 9/2001 | Shiomoto |
| 6,421,429 | B1 | 7/2002 | Merritt et al. |
| 6,470,378 | B1 | 10/2002 | Tracton et al. |
| 6,476,826 | B1 | 11/2002 | Plotkin et al. |
| 6,493,874 | B2 | 12/2002 | Humpleman |
| 6,496,122 | B2 | 12/2002 | Sampsell |
| 6,505,160 | B1* | 1/2003 | Levy et al. .................... 704/270 |
| 6,505,169 | B1* | 1/2003 | Bhagavath et al. ........ 705/14.66 |
| 6,529,506 | B1* | 3/2003 | Yamamoto et al. ........... 370/389 |
| 6,553,147 | B2 | 4/2003 | Chai et al. |
| 6,567,984 | B1 | 5/2003 | Allport |
| 6,597,375 | B1 | 7/2003 | Yawitz |
| 6,665,751 | B1 | 12/2003 | Chen et al. |
| 6,697,356 | B1 | 2/2004 | Kretschmer et al. |
| 6,757,277 | B1 | 6/2004 | Shaffer et al. |
| 6,788,882 | B1 | 9/2004 | Geer et al. |
| 6,795,638 | B1 | 9/2004 | Skelley, Jr. |
| 6,910,175 | B2 | 6/2005 | Krishnamachari |
| 6,970,602 | B1 | 11/2005 | Smith et al. |
| 6,985,932 | B1* | 1/2006 | Glaser et al. .................. 709/219 |
| 7,099,951 | B2 | 8/2006 | Laksono |
| 7,103,905 | B2 | 9/2006 | Novak |
| 7,127,507 | B1 | 10/2006 | Clark et al. |
| 7,155,734 | B1 | 12/2006 | Shimomura et al. |
| 7,382,729 | B2 | 6/2008 | Honda et al. |
| 7,478,164 | B1 | 1/2009 | Lango et al. |
| 7,478,166 | B2 | 1/2009 | Agnoli et al. |
| 7,516,136 | B2 | 4/2009 | Lee et al. |
| 7,577,978 | B1* | 8/2009 | Wistendahl et al. .......... 725/113 |
| 7,583,676 | B2 | 9/2009 | Shobatake |
| 7,594,218 | B1 | 9/2009 | Lozben |
| 7,616,955 | B2 | 11/2009 | Kim |
| 7,661,121 | B2 | 2/2010 | Smith et al. |
| 7,676,590 | B2 | 3/2010 | Silverman et al. |
| 7,707,614 | B2 | 4/2010 | Krikorian et al. |
| 7,721,300 | B2 | 5/2010 | Tipton et al. |
| 7,725,912 | B2 | 5/2010 | Margulis |
| 7,788,696 | B2 | 8/2010 | Burges et al. |
| 7,895,275 | B1 | 2/2011 | Evans et al. |
| 7,913,278 | B2 | 3/2011 | Ellis et al. |
| 7,917,932 | B2 | 3/2011 | Krikorian |
| 7,921,150 | B1 | 4/2011 | Schwartz |
| 7,921,446 | B2 | 4/2011 | Krikorian et al. |
| 7,945,688 | B1 | 5/2011 | Lango et al. |
| 7,975,062 | B2 | 7/2011 | Krikorian et al. |
| 8,051,454 | B2 | 11/2011 | Krikorian et al. |
| 8,060,906 | B2 | 11/2011 | Begeja et al. |
| 8,099,755 | B2 | 1/2012 | Bajpai et al. |
| 8,266,657 | B2 | 9/2012 | Margulis |
| 8,352,991 | B2 | 1/2013 | Cahnbley et al. |
| 8,365,236 | B2 | 1/2013 | Krikorian et al. |
| 8,621,533 | B2 | 12/2013 | Krikorian et al. |
| 8,799,969 | B2 | 8/2014 | Krikorian et al. |
| 8,819,750 | B2 | 8/2014 | Krikorian et al. |
| 2001/0021998 | A1 | 9/2001 | Margulis |
| 2002/0010925 | A1 | 1/2002 | Kikinis |
| 2002/0012530 | A1 | 1/2002 | Bruls |
| 2002/0019984 | A1 | 2/2002 | Rakib |
| 2002/0032907 | A1 | 3/2002 | Daniels |
| 2002/0053053 | A1 | 5/2002 | Nagai et al. |
| 2002/0090029 | A1 | 7/2002 | Kim |
| 2002/0131497 | A1 | 9/2002 | Jang |
| 2002/0143972 | A1 | 10/2002 | Christopoulos et al. |
| 2002/0143973 | A1 | 10/2002 | Price |
| 2002/0151992 | A1 | 10/2002 | Hoffberg et al. |

(56) References Cited

U.S. PATENT DOCUMENTS

| | | | |
|---|---|---|---|
| 2003/0028643 A1 | 2/2003 | Jabri | |
| 2003/0030752 A1* | 2/2003 | Begeja et al. | 348/563 |
| 2003/0078973 A1 | 4/2003 | Przekop et al. | |
| 2003/0088686 A1 | 5/2003 | Jennings | |
| 2003/0159143 A1 | 8/2003 | Chan | |
| 2003/0192054 A1 | 10/2003 | Birks et al. | |
| 2003/0208612 A1 | 11/2003 | Harris et al. | |
| 2003/0231655 A1 | 12/2003 | Kelton et al. | |
| 2003/0231868 A1* | 12/2003 | Herley | 386/69 |
| 2004/0003406 A1* | 1/2004 | Billmaier | 725/60 |
| 2004/0049791 A1 | 3/2004 | Shah et al. | |
| 2004/0068536 A1* | 4/2004 | Demers et al. | 709/201 |
| 2004/0083301 A1 | 4/2004 | Murase et al. | |
| 2004/0098748 A1 | 5/2004 | Bo et al. | |
| 2004/0101271 A1 | 5/2004 | Boston et al. | |
| 2004/0153951 A1 | 8/2004 | Walker et al. | |
| 2004/0177063 A1* | 9/2004 | Weber et al. | 707/3 |
| 2004/0205830 A1* | 10/2004 | Kaneko | 725/135 |
| 2004/0215458 A1* | 10/2004 | Kobayashi et al. | 704/251 |
| 2004/0220791 A1* | 11/2004 | Lamkin et al. | 703/11 |
| 2004/0220926 A1* | 11/2004 | Lamkin et al. | 707/3 |
| 2004/0236844 A1 | 11/2004 | Kocherlakota | |
| 2004/0246936 A1 | 12/2004 | Perlman | |
| 2004/0254887 A1* | 12/2004 | Jacoby | 705/52 |
| 2005/0021830 A1 | 1/2005 | Urzaiz et al. | |
| 2005/0165795 A1* | 7/2005 | Myka et al. | 707/100 |
| 2005/0172028 A1 | 8/2005 | Nilsson et al. | |
| 2005/0204046 A1 | 9/2005 | Watanabe | |
| 2005/0246451 A1 | 11/2005 | Silverman et al. | |
| 2005/0262534 A1 | 11/2005 | Bontempi et al. | |
| 2005/0262539 A1 | 11/2005 | Barton et al. | |
| 2006/0050970 A1 | 3/2006 | Gunatilake | |
| 2006/0095401 A1 | 5/2006 | Krikorian et al. | |
| 2006/0095472 A1 | 5/2006 | Krikorian et al. | |
| 2006/0101499 A1 | 5/2006 | Aravamudan et al. | |
| 2006/0156219 A1 | 7/2006 | Haot et al. | |
| 2006/0156374 A1* | 7/2006 | Hu et al. | 725/135 |
| 2006/0171395 A1 | 8/2006 | Deshpande | |
| 2006/0184980 A1 | 8/2006 | Cole | |
| 2006/0190616 A1 | 8/2006 | Mayerhofer et al. | |
| 2006/0206526 A1 | 9/2006 | Sitomer | |
| 2006/0230345 A1 | 10/2006 | Weng et al. | |
| 2006/0265384 A1 | 11/2006 | Lee et al. | |
| 2006/0280177 A1 | 12/2006 | Gupta et al. | |
| 2006/0294183 A1 | 12/2006 | Agnoli et al. | |
| 2007/0043792 A1 | 2/2007 | O'Brien | |
| 2007/0061783 A1 | 3/2007 | Prakash | |
| 2007/0067390 A1 | 3/2007 | Agnoli et al. | |
| 2007/0073767 A1 | 3/2007 | Springer et al. | |
| 2007/0127437 A1 | 6/2007 | Ozawa | |
| 2007/0136778 A1 | 6/2007 | Birger et al. | |
| 2007/0168543 A1 | 7/2007 | Krikorian et al. | |
| 2007/0260462 A1 | 11/2007 | Andersen et al. | |
| 2007/0274327 A1 | 11/2007 | Kaarela et al. | |
| 2008/0007651 A1 | 1/2008 | Bennett | |
| 2008/0195698 A1 | 8/2008 | Stefanovic et al. | |
| 2008/0199150 A1 | 8/2008 | Candelore | |
| 2008/0215392 A1 | 9/2008 | Rajan | |
| 2009/0103607 A1 | 4/2009 | Bajpai et al. | |
| 2009/0157697 A1 | 6/2009 | Conway et al. | |
| 2009/0157777 A1 | 6/2009 | Golwalkar et al. | |
| 2009/0254672 A1 | 10/2009 | Zhang | |
| 2009/0268740 A1 | 10/2009 | Sindhu et al. | |
| 2009/0300205 A1 | 12/2009 | Jabri | |
| 2010/0023642 A1 | 1/2010 | Ladd et al. | |
| 2010/0169477 A1 | 7/2010 | Stienhans et al. | |
| 2010/0226444 A1 | 9/2010 | Thevathasan et al. | |
| 2010/0269144 A1 | 10/2010 | Forsman et al. | |
| 2010/0281042 A1 | 11/2010 | Windes et al. | |
| 2010/0309916 A1 | 12/2010 | Oskouy et al. | |
| 2011/0002381 A1 | 1/2011 | Yang et al. | |
| 2011/0047079 A1 | 2/2011 | Du et al. | |
| 2011/0050908 A1 | 3/2011 | Nam | |
| 2011/0125861 A1 | 5/2011 | Evans et al. | |
| 2011/0307608 A1 | 12/2011 | Chang et al. | |
| 2012/0166669 A1 | 6/2012 | Price | |
| 2012/0219001 A1 | 8/2012 | Sindhu et al. | |

FOREIGN PATENT DOCUMENTS

| | | |
|---|---|---|
| CN | 1464685 A | 12/2003 |
| EP | 0515101 A2 | 11/1992 |
| EP | 0690626 A2 | 1/1996 |
| GB | 2307151 A | 5/1997 |
| JP | 11289350 A | 10/1999 |
| JP | 2001054066 A | 2/2001 |
| JP | 2003046582 A | 2/2003 |
| JP | 2003114845 A | 4/2003 |
| JP | 2003179580 A | 6/2003 |
| JP | 2004007127 A | 1/2004 |
| JP | 2004015111 A | 1/2004 |
| JP | 2004072686 A | 3/2004 |
| JP | 2005032120 | 2/2005 |
| TW | 200703018 A | 1/2007 |
| WO | 9837701 | 8/1998 |
| WO | 0072596 A1 | 11/2000 |
| WO | 02073443 A1 | 9/2002 |
| WO | 03026232 A1 | 3/2003 |
| WO | 2004045218 A1 | 5/2004 |
| WO | 2005122025 A2 | 12/2005 |
| WO | 2006064454 A1 | 6/2006 |
| WO | 2007027891 A2 | 3/2007 |
| WO | 2007051156 A2 | 5/2007 |

OTHER PUBLICATIONS

USPTO "Non-Final Office Action" mailed Sep. 6, 2011; U.S. Appl. No. 12/347,465, filed Dec. 31, 2008.

USPTO "Notice of Allowance" mailed Sep. 22, 2011; U.S. Appl. No. 12/979,145, filed Dec. 27, 2010.

Japan Patent Office "Notice of Grounds for Rejection (Office Action)" mailed Jun. 28, 2011; Japanese Patent Appln. No. P2008-507651.

China Patent Office "Office Action" mailed Feb. 23, 2011; Chinese Patent Appln. No. 200680022520.6.

China Patent Office "Office Action" mailed Jan. 6, 2911; Chinese Patent Appln. No. 200810126554.0.

USPTO "Non-Final Office Action" mailed Mar. 4, 2011; U.S. Appl. No. 12/757,697, filed Apr. 9, 2010.

USPTO "Final Office Action" mailed Mar. 10, 2011; U.S. Appl. No. 11/111,265, filed Apr. 21, 2005.

Canadian Patent Office "Office Action" mailed Mar. 17, 2011; Canadian Patent Appln. No. 2,606,235.

Sikora, Thomas "Trends and Perspectives in Image and Video Coding," Proceedings of the IEEE, vol. 93 No. 1, pp. 6-17, Jan. 1, 2005.

Vetro, Anthony et al. "Video Transcoding Architectures and Techniques: An Overview," IEEE Signal Processing Magazine, vol. 20, No. 2, pp. 18-29, Mar. 1, 2003.

De Lattre, Alexis et al. "VideoLAN Streaming Howto," Internet Citation, Jan. 22, 2005; http://www.videolan.org/doc/streaming-howto/en/.

USPTO "Non-Final Office Action" mailed Mar. 29, 2011; U.S. Appl. No. 12/979,145, filed Dec. 27, 2010.

The International Bureau of WIPO "International Preliminary Report on Patentability" mailed Jun. 30, 2011; International Appln. No. PCT/IN2009/000728, filed Dec. 18, 2009.

Lee, M. et al. "Video Frame Rate Control for Non-Guaranteed Network Services with Explicit Rate Feedback," Globecom'00, 2000 IEEE Global Telecommunications conference, San Francisco, CA, Nov. 27-Dec. 1, 2000; [IEEE Global Telecommunications Conference], New York, NY; IEEE, US, vol. 1,Nov. 27, 2000, pp. 293-297, XP001195580; ISBN: 978-0-7803-6452-3, lines 15-20 of sec. II on p. 293, fig. 1.

The International Bureau of WIPO "International Preliminary Report on Patentability" mailed Jul. 14, 2011; International Appln. No. PCT/US2009/068468, filed Dec. 17, 2009.

European Patent Office "Extended European Search Report" dated Feb. 28, 2011; Appln. No. 06734554.

(56) References Cited

OTHER PUBLICATIONS

Japan Patent Office "Decision of Rejection (Final Rejection)" mailed Mar. 15, 2011; Patent Appln. No. 2007-527683.
China State Intellectual Property Office "Second Office Action" mailed May 18, 2011; Appln. No. 200780030811.4.
USPTO "Non-Final Office Action" mailed Jun. 28, 2011; U.S. Appl. No. 12/339,878, filed Dec. 19, 2008.
USPTO "Non-Final Office Action" mailed Sep. 16, 2011; U.S. Appl. No. 11/111,265, filed Apr. 21, 2005.
USPTO "Notice of Allowance", mailed Oct. 18, 2011; U.S. Appl. No. 12/339,878, filed Dec. 19, 2008.
China State Intellectual Property Office, Decision of Rejection:, Issued Sep. 15, 2011; Chine Patent Appln. No. 200780030811.4.
China State Intellectual Property Office "First Office Action of China State Intellectual Property Office," issued Oct. 9, 2010; Application No. 200780030811.4.
European Patent Office "EPO Communication" dated Nov. 29, 2010; Application No. 08 167 880.7-2202.
Korean Intellectual Property Office "Official Notice of Preliminary Rejection," issued Dec. 29, 2010; Patent Application No. 10-2009-7003607.
China State Intellectual Property Office "Second Office Action of China State Intellectual Property Office, " issued Aug. 26, 2010; Application No. 200810126554.0.
USPTO Non-Final Office Action mailed Aug. 11, 2010; U.S. Appl. No. 11/111,265, filed Apr. 21, 2005.
USPTO Final Office Action mailed Sep. 24, 2010; U.S. Appl. No. 11/620,707, filed Jan. 7, 2007.
USPTO Non-Final Office Action mailed Sep. 30, 2010; U.S. Appl. No. 12/758,193, filed Apr. 12, 2010.
USPTO Non-Final Office Action mailed Sep. 29, 2010; U.S. Appl. No. 12/758,194, filed Apr. 12, 2010.
USPTO Non-Final Office Action mailed Sep. 30, 2010; U.S. Appl. No. 12/758,196, filed Apr. 12, 2010.
USPTO Non-Final Office Action mailed Oct. 4, 2010; U.S. Appl. No. 12/643,812, filed Dec. 21, 2009.
Japan Patent Office "Notice of Grounds for Rejection (Office Action)," mailed May 25, 2010; Patent Application No. 2007-0268269.
Japan Patent Office "Notice of Grounds for Rejection (Office Action)," mailed May 25, 2010; Patent Application No. 2007-527683.
European Patent Office, International Searching Authority, "International Search Report and Written Opinion," mailed Jun. 4, 2010 for International Application No. PCT/IN2009/000728, filed Dec. 18, 2009.
Chinese Intellectual Property Office "Office Action" mailed Apr. 10, 2012 for Chinese Application 200810126554.0.
Japan Patent Office "Office Action" mailed Feb. 28, 2012 for Japanese Application P2008-507651.
Canadian Intellectual Property Office "Office Action" mailed on Feb. 16, 2012 for Canadian Application 2,660,350.
Taiwan Intellectual Property Office "Office Action" mailed Feb. 23, 2012 for Taiwan Application 097137393.
European Office Action, dated Nov. 30, 2011, for European Patent Application No. 06 734 554.6-2223.
Chinese Office Action, dated Dec. 31, 2011, for Chinese Patent Application No. 200810161874.X.
China State Intellectual Property Office, "Reexamination Office Action" mailed Mar. 5, 2012; Chinese Appln. No. 200580026825.X.
USPTO "Non-Final Office Action" mailed Feb. 24, 2012; U.S. Appl. No. 13/240,932, filed Sep. 22, 2011.
China Intellectual Property Office, "Second Office Action" mailed Feb. 15, 2012; Appln. No. CN200680022520.6.
Canadian Intellectual Property Office, "Office Action" mailed Nov. 28, 2011; Canadian Appln. No. 2,606,235.
Japanese Patent Office "Decision of Rejection (Final Rejection)" dated Jan. 29, 2013 for Japanese Patent Appln. No. 2008-507651.
USPTO "Non-Final Office Action" dated Mar. 11, 2013 for U.S. Appl. No. 13/079,644.
USPTO "Non-Final Office Action" dated Mar. 5, 2013 for U.S. Appl. No. 13/107,341.
European Patent Office Supplementary Search Report dated Mar. 6, 2013 for European Patent Appln. No. 05758509.3.
Intellectual Property Office "Office Action" dated Feb. 25, 2013 for Taiwan Patent Appln. No. 098146025.
Japan Patent Office "Hearing" mailed Apr. 24, 2012 for Japanese Patent Appin. No. 2007-527683.
Japan Patent Office "Hearing" mailed Apr. 24, 2012 for Japanese Patent Appin. No. 2007-268269.
European Patent Office "Office Action" dated Aug. 7, 2012 for European Patent Appin. No. 06 734 554.6.
China Patent Office "Office Action" issued Aug. 3, 2012 for Chinese Patent Appin. No. 200810161874.X.
USPTO "Notice of Allowance" mailed Aug. 31, 2012 for U.S. Appl. No. 11/620,711, filed Jan. 7, 2007.
M2 Presswire, Aug. 16, 2006, OTCPicks.com; Daily Market Movers Digest Midday Stock Alerts for Wednesday, Aug. 16, AMRU, IPTM, BCLC, IHDR, EGIL © 1994-2006 M2 Communications LTD.
USPTO "Notice of Allowance" mailed Jun. 12, 2012 for U.S. Appl. No. 13/240,932, filed Sep. 22, 2011.
USPTO "Final Office Action" mailed Apr. 27, 2012 for U.S. Appl. No. 12/347,465, filed Dec. 31, 2008.
USPTO "Notice of Allowance" mailed Jul. 6, 2012 for U.S. Appl. No. 11/111,265, filed Apr. 21, 2005.
USPTO "Non-Final Office Action" mailed Oct. 23, 2012 for U.S. Appl. No. 13/194,783, filed Jul. 29, 2011.
USPTO "Non-Final Office Action" mailed Sep. 14, 2012 for U.S. Appl. No. 12/635,138, filed Dec. 12, 2009.
China State Intellectual Property Office "Third Office Action" issued Dec. 5, 2012 for Chinese Patent Appln. No. 200680022520.6.
European Patent Office "Extgended Search Report" dated Nov. 27, 2011 for European Patent Appln. No. 12187858.1.
USPTO "Notice of Allowance" mailed Sep. 25, 2012 for U.S. Appl. No. 13/240,932, filed Sep. 22, 2011.
China State Intellectual Property Office "Fourth Office Action" dated Mar. 5, 2013 for Chinese Patent Appln. No. 200810161874.X.
Eurpoean Patent Office, Examination Report, dated Sep. 6, 2013 for European Patent Application No. 12 187 858.1.
Japan Patent Office, Hearing, dated Aug. 13, 2013 for Japanese Patent Application No. P2008-507651.
European Patent Office, Examination Report, dated Jul. 25, 2013 for European Patent Application No. 05 758 509.3.
China State Intellectual Property Office, First Office Action, dated Aug. 2, 2013 for Chinese Patent Application No. 200980151308.3.
USPTO, Non-Final Office Action, dated Aug. 7, 2013 for U.S. Appl. No. 13/609,033.
USPTO, Final Office Action, dated Sep. 19, 2013 for U.S. Appl. No. 13/107,341.
Canadian Intellectual Property Office, Office Action, dated Sep. 3, 2013 for Canadian Patent Application No. 2,660,350.
USPTO, Notice of Allowance, dated Sep. 20, 2013 for U.S. Appl. No. 13/079,644.
China State Intellectual Property Office, Office Action, dated Sep. 29, 2013 for Chinese Patent Application No. 200810161874.X.
USPTO, Final Office Action mailed May 8, 2013 for U.S. Appl. No. 13/194,783.
USPTO, Office Action mailed May 8, 2013 for U.S. Appl. No. 13/194,834.
USPTO, Office Action mailed Jun. 20, 2013 for U.S. Appl. No. 13/615,306.
USPTO, Notice of Allowance mailed Jun. 24, 2013 for U.S. Appl. No. 12/635,138.
USPTO, Final Office Action mailed Jul. 17, 2013 for U.S. Appl. No. 13/079,644.
China State Intellectual Property Office, Office Action, dated Jul. 1, 2013 for China Patent Appln. No. 200680022520.6.
European Patent Office, Extended Search Report mailed May 24, 2013 for European Patent Application No. 07814265.0.
Canadian Intellectual Property Office, Office Action mailed Sep. 30, 2013 for Canadian Patent Application No. 2,747,539.
USPTO, Final Office Action mailed Dec. 5, 2013 for U.S. Appl. No. 13/194,834.

(56) References Cited

OTHER PUBLICATIONS

Li Zhuo et al: "Adaptive forward error correction for streaming stored MPEG-4 FGS video over wireless channel", IEEE 5th Workshop on Signal Processing Advances in Wireless Communications, 2004, Jan. 1, 2004, pp. 26-30, XP055091312, DOI: 10.1109/SPAWC.2004. 1439196 ISBN: 978-0-78-038337-1.
European Patent Office, Summons to attend oral proceedings pursuant to Rule 115(1) EPC, mailed Jan. 15, 2014 for European Patent Application No. 06734554.6.
Japan Patent Office, Notice of Ground(s) for Rejection, mailed Feb. 18, 2014 for Japanese Patent Application No. P2008-507651.
Office of the Controller-General of Patents, Designs and Trademarks, First Examination Report, mailed Mar. 21, 2014 for India Patent Application No. 3740/KOLNP/2006.
USPTO, Non-Final Office Action, mailed Mar. 27, 2014 for U.S. Appl. No. 13/073,469.
USPTO, Non-Final Office Action, mailed May 15, 2014 for U.S. Appl. No. 13/194,783.
USPTO, Notice of Allowance, mailed May 28, 2014 for U.S. Appl. No. 13/615,306.
USPTO, Final Office Action, mailed Jun. 18, 2014 for U.S. Appl. No. 13/609,033.
USPTO, Non-Final Office Action, mailed Jul. 16, 2014 for U.S. Appl. No. 13/194,834.
USPTO, Non-Final Office Action, mailed Jan. 6, 2014 for U.S. Appl. No. 13/615,306.
U.S. Patent and Trademark Office, Non-Final Office Action, dated Sep. 5, 2014 for U.S. Appl. No. 14/144,225.
China State Intellectual Property Office, Office Action, dated Nov. 5, 2014 for Chinese Patent Application No. 200980151308.3.
European Patent Office, Communication under Rule 71(3) EPC for European Patent Application No. 06 734 554.6 mailed Feb. 13, 2015.
European Patent Office, Communication pursuant to Article 94(3) EPC for European Patent Application No. 05 758 509.3 mailed Mar. 3, 2015.
USPTO, Office Action for U.S. Appl. No. 14/449,896 mailed Feb. 18, 2015.
USPTO, Final Office Action for U.S. Appl. No. 13/194,834 mailed Mar. 3, 2015.
USPTO, U.S. Appl. No. 14/449,896 filed Aug. 1, 2014.
Office of the Controller-General of Patents, Designs and Trademarks, First Examination Report for Indian Patent Application No. 4190/KOLNP/2007 mailed Feb. 27, 2015.
U.S. Appl. No. 14/468,059, filed Aug. 25, 2014.
State Intellectual Property Office of the People'S Republic of China, Office Action for Chinese Patent Application No. 201210572890.4 mailed Feb. 9, 2015.
USPTO, Office Action for U.S. Appl. No. 14/468,059 mailed Apr. 7, 2015.
USPTO, Notice of Allowance and Fee(s) Due for U.S. Appl. No. 14/144,225 mailed Apr. 8, 2015.
ReplayTV 5000 User Guide, 2002, pp. 51-52.

\* cited by examiner

SELECTION AND PRESENTATION OF CONTEXT-RELEVANT SUPPLEMENTAL CONTENT AND ADVERTISING

CROSS-REFERENCES TO RELATED APPLICATIONS

This application is a continuation of U.S. Non-Provisional application Ser. No. 11/683,862 filed Mar. 8, 2007, now U.S. Pat. No. 7,769,756 B2 issued Aug. 3, 2010, which claims the benefit of U.S. Provisional Application No. 60/780,709, filed on Mar. 8, 2006, which is hereby incorporated by reference in its entirety; application Ser. No. 11/683,862 is also a continuation-in-part of U.S. application Ser. No. 11/147,664, filed on Jun. 7, 2005, which claims the benefit of U.S. Provisional Application No. 60/577,833, filed Jun. 7, 2004, both of which are hereby incorporated by reference in their entirety.

BACKGROUND

1. Field of the Invention

This invention relates generally to media applications, and in particular to presenting context-relevant supplemental content in a media player.

2. Background of the Invention

Television and other media content are increasingly finding a home on new devices. For example, television programming is no longer found solely on the television. Through computer networks, as well as other delivery mechanisms, media content can be consumed on electronic devices, such as personal computers and cellular phones.

Media content is often provided with supplemental content to the users (e.g., viewers, consumers) of the media content. This supplemental content can generate income for the content provider (e.g., advertising revenue for providing advertisements in television programs) and/or provide additional information to the users (e.g. display news scrollbar on top of a television program). However, the supplemental content provided generally is not relevant to the context of the particular user consuming the particular media content (e.g., the content of the media content, the user's preference, etc.), and therefore not of much interest to the user.

Accordingly, there is a need for a system and method to select context-relevant supplemental content for media content and present the supplemental content to users of the media content.

SUMMARY

Embodiments of the invention provide a system and method to select context-relevant supplemental content for media content and present the context-relevant supplemental content and the media content to users. In one embodiment, context information of the media content is determined; supplemental content is selected based on the context information and present to the users.

One skilled in the art will readily recognize from the following discussion that alternative embodiments of the structures and methods illustrated herein may be employed without departing from the principles of the invention described herein.

DETAILED DESCRIPTION OF THE EMBODIMENTS

Overview

Embodiments of the invention include systems and methods to pair media content with context-relevant (or context-specific) supplemental content and present the media content and the supplemental content to a user. In the following description, media content may include, without limitation, one or a combination of audio (including music, radio broadcasts, recordings, advertisements, etc.), video (including movies, video clips, television broadcasts, advertisements, etc.), data (such as streaming weather data), software (including video games, multimedia programs, graphics software), text and pictures. Media content may be in analog or digital form, and may be delivered as one or more individual files (e.g., media clip) or one or more media streams. Media streams can be encoded using any encoding technology and may be encrypted to protect their content using any suitable encryption technique.

Similar to media content, supplemental content may include one or a combination of the types of media content described above. One example of the supplemental content including a combination of different types of media content is a multimedia web page. The supplemental content may be interactive. For example, the content may be a hyperlink on which a user can click to obtain a web page that is relevant to the media stream. Alternatively, the content may comprise a communication link, such as a Voice over Internet Protocol (VoIP) call, or a button or other user interface device for placing such a call or initiating a software download.

Figure 1:
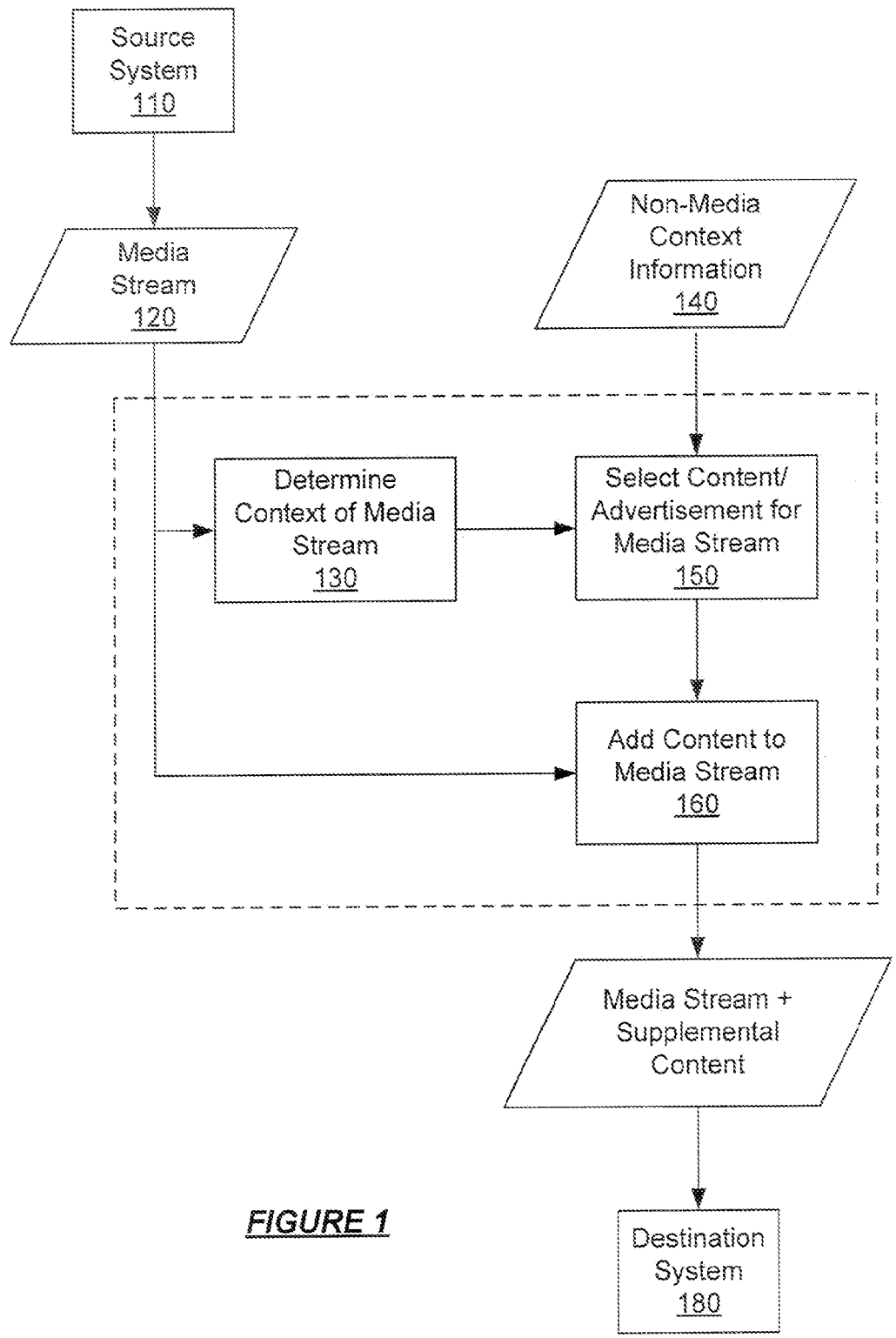
FIG. 1 is a flow diagram of a process for presenting context-relevant supplemental content to a user, according to one embodiment of the invention.

FIG. 1 shows a flow diagram of a process for presenting context-relevant supplemental content to a user according to one embodiment of the present invention. The process starts with a source system 110 (e.g., a television broadcasting station) transmitting a media stream 120 (e.g., a television program) to a context detection and supplemental content selection system ("the context system") (represented by a dashed line box in the FIG. 1).

The context system determines 130 context of the media stream and selects 150 content and/or advertisement for the media stream based on the determined context. In one embodiment, the context system can also receive non-media context information 140 (e.g., the user's preferences) from an external source and make the selection 150 based at least in part on the non-media context information. The context system can add 160 the selected content and/or advertisement (the context-relevant supplemental content) to the media stream. The context system can send the media stream and the supplemental content to the destination system 180, which can present the media stream and the context-relevant supplemental content to the user.

System Architecture

Figure 2:
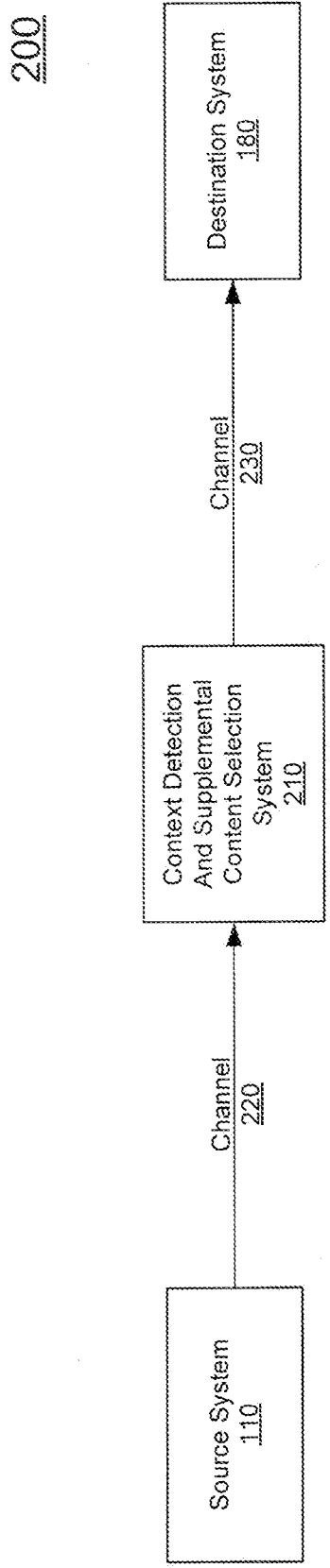
FIG. 2 is a system that includes a source system, a context detection and supplemental content selection system and a destination system, according to one embodiment of the invention.

FIG. 2 is a high-level block diagram of a system 200 according to one embodiment of the present invention. The system 200 includes a source system 110, a context detection and supplemental content selection system ("the context system") 210, and a destination system 180. A channel 220 exists between the source system 110 and the context system 210. A channel 230 exits between the context system 210 and the destination system 180.

The source system 110 includes hardware and/or software devices that are configured to transmit media content to the context system 210. It may be a central server at a remote broadcasting location, a network access server, a network storage device, or a computer at a user's home. Alternatively, the source system 110 may include multiple computers as in a peer-to-peer scenario. In one embodiment, the source system 110 can be a broadcast station (e.g., radio station and television station) that broadcasts media content over the air or through other channels such as cable networks. The source system 110 may provide services such as video on demand or pay-per-view. In another embodiment, the source system 110 can be an audio/video device such as a cable box, a satellite receiver, a DVD player, or a digital video recorder (DVR). In yet another embodiment, the source system 110 can be a time-shifting device (e.g., a personal video recorder) or a placeshifting device (e.g., a personal broadcaster).

In placeshifting, a user can watch or listen to live, recorded or stored media on a remote device via a data network. For example, a user may stream content from a first device at home (such as a satellite receiver, cable box, or digital video recorder) to a second device (such as a cellular phone), which can receive the media from across the house, across town, or across the world. This transmission may use public or private networks. A product that currently provides such a placeshifting application is the SLINGBOX™ from Sling Media, Inc., and described in U.S. application Ser. No. 11/147,664, filed Jun. 7, 2005, the contents of which are incorporated by reference in their entirety.

The context system 210 includes hardware and/or software devices that are configured to receive media content from the source system 110 through the channel 220, and determine context information of the media content. In one embodiment, the context system 210 is further configured to select context-relevant supplemental content of the received media content based at least in part on the determined context information, and send (or transmit) the supplemental content and the media content to the destination system 180 through the channel 230. In another embodiment, the context system 210 sends the context information to the destination system 180, which selects the context-relevant supplemental content based at least in part on the received context information and presents the supplemental content and the media content to users. In one embodiment, the context system 210 can be configured to convert the received media content from one media format to another or perform any other transcoding, encoding, translation, digitization (such as converting media content from analog form to digital form), or other processing on the media content as desired. In one embodiment, the context system 210 may transmit information to the source system 110.

The destination system 180 includes hardware and/or software devices that are configured to play the media content and the supplemental content to users (or viewers). The destination system 180 may include one or more output devices, such as a television, a speaker, a personal computer, a personal digital assistant (PDA), a cellular phone, a dedicated set top box that outputs to a television or monitor, or any other type of device that can receive and render media data. In one embodiment, the destinations system 180 may play the media content and the supplemental content in the same media output device(s) or different media output devices. In one embodiment, the destination system 180 can transmit information to the context system 210 and/or the source system 110.

In one embodiment, the source system 110, the context system 210, and the destination system 180 are structured to include a processor, memory, storage, network interfaces, and applicable operating system and other functional software (e.g., network drivers and communication protocols).

The channel 220 is the delivery pathway through which the source system 110 transmits the media content to the context system 210. The channel 230 is the delivery pathway through which the context system 210 transmits the media content and the supplemental content to the destination system 180. Media content and/or supplemental content may be delivered through a variety of pathways, including, but not limited to, the following: over the air via analog or digital radio frequency (RF) transmission; Internet protocol (IP) transmission delivered over a wired network or a wireless network (or a combination) in a unicast or multicast method; wireless or wired networks (which may or may not be IP) dedicated to the delivery of multimedia content (e.g., Qualcomm's MediaFLO); and satellite transmission. Therefore, the channels 220 and 230 may include, without limitation, one or a combination of air, wired or wireless network, and satellite. In one embodiment, the channel 220 and/or the channel 230 include the Internet. In another embodiment, the channel 220 and/or the channel 230 may be completely within a device, such as where the context system 210 is on the same device as the destination system 180 or the same device as the source system 110. For example, a computing system may be configured to stream media content to the destination system 180 and select and send context-relevant supplemental content to the destination system 180, thereby serving as both the source system 110 and the context system 210.

Operation

Figure 3:
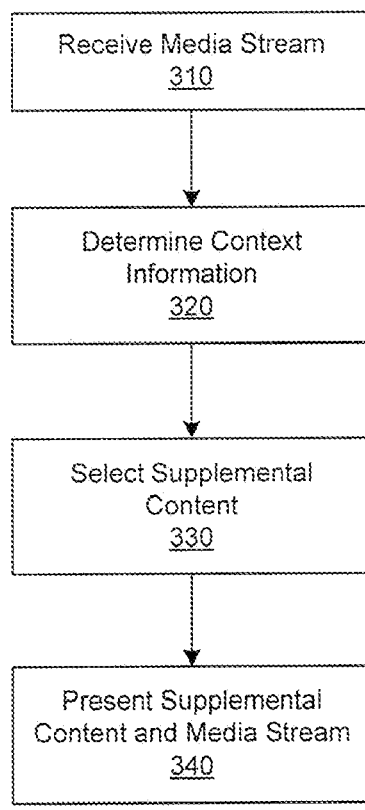
FIG. 3 is a flowchart of a method for selecting and presenting context-relevant supplemental content for a media stream, according to one embodiment of the invention.

FIG. 3 is a flowchart of a process of the context system 210 for selecting and presenting context-relevant supplemental content in accordance with one embodiment of the invention. This process may be implemented in software, hardware, or a combination of hardware and software. In one embodiment, a part or the whole process may be implemented in the source system 110 and/or the destination system 180.

As illustrated in FIG. 3, the context system 210 receives 310 a media stream from the source system 110. The context system 210 then determines 320 context information about the media stream. Based at least in part on the determined context information, the context system 210 selects 330 supplemental content and presents 340 the supplemental content and the media stream via a destination system 180. Further detailed for each step of the process are described below.

Receiving the Media

The context system 210 receives 310 the media stream from the source system 110. In one embodiment, the media stream is delivered to the context system 210 through broadcast distribution either over the air (e.g., traditional radio and television broadcasting) or through a broadcast network (e.g., cable radio and cable television). In another embodiment, the media stream may be delivered to the context system 210 upon demand (e.g., through a video on demand service). Alternatively, the media stream may be obtained from a device that is configured to playback locally stored media streams.

In one embodiment, the media stream is sent to the context system 210 as a series of small packets from a single source (e.g., a media server) or multiple sources (e.g., multiple computers in a peer-to-peer network where the media stream is distributedly stored). The media stream may be sent using Datagram protocols. Depending on how the context system 210 is configured to determine 320 the context information, the context system 210 may or may not assemble the packets to construct the media stream.

Determining the Context Information

The context system 210 determines 320 context information about the received media stream. Many different types of context information may be used in embodiments of the system. For example, the context information may be related to (1) the content within the media stream, (2) the destination system 180, and/or (3) the user (e.g., viewer or consumer) of the media stream. As is described in greater detail below, the context system 210 may determine 320 the context information using any of a variety of methods.

In one embodiment, the context system 210 has one or more desired schemes for providing supplemental content. For example, the context system 210 may be configured to provide content-relevant advertisements for some advertisers. These desired schemes may favor some context information over others. Depending on what context information is desired, the context system 210 may use various methods to determine 320 the context information.

One type of context information relates to the content within the media stream (content-relevant context information). This type of context information may include any information about the media stream, such as the name of a program in the stream, actors in the program, genre of the program. For example, for a media stream including a clip of a baseball game, the context information may include the identity of the baseball player at bat.

One method to determine 320 the content-relevant context information uses text transcripts of the media stream. Broadcasting is often accompanied by text transcripts for the hearing impaired. The text transcripts include transcript of the video program and/or advertisement that is currently being broadcasted. These text transcripts may be included in metadata such as closed captioning and teletext. Depending on the video transmission standard and/or the delivery mechanism, the text transcripts can be transmitted using a variety of methods. For example, the closed captioning can be contained within the Vertical Blanking Interval (VBI) according to the NTSC standard. As another example, the text transcripts can be embedded in the IP packets of the media stream.

Because the text transcripts include a (nearly) literal transcript of the content in the media stream, they likely contain very useful information for determining content-relevant context information. The text transcripts could contain information which indicates the genre of a media program in the media stream, the title of the media program, or the precise content or dialog that is the focus of the media program and/or advertisements at any point during the media program. For example, through the processing of the closed capturing transmitted during an airing of the television program Daily Show, the context system 210 can determine 320 that the viewer is watching the "Daily Show," that the host is "Jon Stewart," that the guest is "David Sedaris," that the name of the new book Mr. Sedaris is writing is "Me Talk Pretty One Day," and that the topics covered during the show were "the war in Iraq," "Chief Justice Roberts," and "Wal-Mart." In addition, the natures and sponsors of the various advertisements (e.g., "Ford" and "Mustang") presented during the program may be similarly determined 320.

As described above, the context information may be determined 320 based on the desired schemes for providing supplemental content. For example, if the desired schemes include advertisements for major retailers and automobile manufacturers, the content-relevant context information determined 320 for the Daily Show program will include terms such as "Wal-Mart," "Ford," and "Mustang," not terms such as "the war in Iraq."

In one embodiment, the context system 210 can determine 320 the context information in real time as it receives 310 the relevant content in the media stream. This can be important for the supplemental content providers. For example, a company may want to show its advertisement to a user soon after media content related to the company is presented to the user.

Another method to determine 320 the content-relevant context information uses text messages displayed graphically in the video content in the media stream. In one embodiment, the context system 210 can determine 320 the text messages using optical character recognition (OCR) technology. By translating the graphical text messages into recognizable words, the text messages displayed may then be used to determine 320 the content-relevant context information.

Other methods of determining 320 the content-relevant context information include object recognition, voice recognition, and other content recognition by processing the content of the media stream using a variety of algorithms. This enables the context system 210 to determine 320 content-relevant context information by identifying objects that are shown and words that are spoken in the media stream.

In one embodiment, a content provider can put a certain signal in the media stream (e.g., an identifier in the VBI) to indicate the presence of a specific content. The context system 210 may be configured to detect and recognize these signals and determine 320 context information accordingly. In another embodiment, the context system 210 may use media fingerprints to determine 320 context information about the media stream. A characteristic digital fingerprint may be generated for a portion of a media program (such as an audio portion of the media, or a time period thereof). The digital fingerprint may then be referenced against a database of fingerprints for known media items, and thereby be used to identify the media program or information about it, such as genre, scene changes, and specific programming ID of the media program.

In one embodiment, a content provider can transmit context information (e.g., media fingerprint, text transcripts) in the audio signals of the media stream. For example, the content provider can transmit a content indicator in the sub-audible tone (or other audio tone that is not noticeable to the average listener at normal volume levels) of an audio stream. The context system 210 may be configured to detect and recognize the context information embedded in the audio signals, and thereby use it to determine context information about the received media stream.

The context system 210 may use information from sources other than the media stream to determine 320 the content-related context information. Such sources may be third-party databases, such as web services and electronic program guides (EPG). An EPG contains descriptive information about the content of programs in multiple channels. The context system 210 may retrieve descriptive information from the EPG using identification information such as the date and time when the program is broadcasted, the location of the destination system 180, the service provider and subscribed package (e.g., Comcast basic cable), and the current channel being viewed. The context system 210 may retrieve the identification information from the destination system 180 and/or the source system 110. In one embodiment, the source system 110 is a placeshifting device which can provide such information to the context system 210 along with the media stream.

Another type of context information that may be used to select 230 supplemental content related to the user, the destination system 180, or other information that is not determined solely by the media stream. This type of context information may be called usage-relevant context information (or non-media context information). Examples of usage-relevant context information include configurations and capabilities of the destination system 180 (e.g., type and model of equipped output device, operating system), time and location of the output device playing the media stream, and information about the user (e.g., web browsing histories of the user). The context system 210 may retrieve the usage-relevant context information from the source system 110, the destination system 180, or some other source. For example, the context system 210 may determine 320 the location of the destination system 180 using the IP address of the destination system 180. As another example, the context system 210 may retrieve user registration data from the source system 110. Assuming the destination system 180 includes a personal computer, the context system 210 may use software programs or data located on the computer (such as web histories and Internet cookies) to determine 320 context information about the user.

The context system 210 may also derive additional contextual information based on the determined context information. For example, knowing that the viewer lives in one state (e.g., through user registration data) and is presently viewing media content in another state (e.g., through IP address of the destination system 180), the context system 210 may infer that the viewer is traveling. The inferred context information may be used to select 330 supplemental content that would be highly relevant for a traveler, such as a local restaurant guide for travelers.

Therefore, the context system 210 may determine 320 the content-relevant context information (derived from the media stream itself) and/or the usage-relevant context information (derived from sources other than the media stream) of the media stream.

Selecting Supplemental Content

Once the context information is determined 320, the context system 210 selects 330 supplemental content using that context information. In one embodiment, the context system 210 is configured to select 330 the supplemental content that is most relevant to the user, and thus most valuable to parties of interest (e.g., the user, supplemental content providers).

In one embodiment, the context system 210 uses the context information to select 330 the supplemental content from a collection of supplemental content. The collection of supplemental content may include advertisements or other information that may be relevant to the media. The collection of supplemental content may be stored locally in the context system 210 or externally in devices such as third-party databases and the destination system 180.

In one embodiment, the context system 210 conducts the selection 330 based at least in part on the content-relevant context information. Supplemental content providers (e.g., advertisers) may prefer to provide their supplemental content (e.g., advertisements) with media programs that are relevant in some way to the thing being advertised. For example, a company may want to present its own advertisement to the viewer whenever its competitor's advertisement appears. As another example, a company may want to supplement its own advertisements with additional information or timely offers. Beneficially, the users are more likely to be interested in supplemental information that is relevant to the content of the media program they are watching. For example, a viewer would be more likely to be interested in a brief biography of Chief Justice Roberts if the viewer is watching a television program about the judicial nomination of John Roberts.

In one embodiment, the context system 210 conducts the selection 330 based at least in part on the usage-relevant context information. In one embodiment, the output device of the destination system 180 presenting 340 the media stream may influence the selection 330 of the supplemental content. For example, the context system 210 may select 330 a cellular phone plan advertisement if the user is watching the media via a cellular phone, but select 330 a cable service advertisement if the user is watching via a television or personal computer. In another embodiment, the inventory of the destination system 180 may impact the supplemental content the context system 210 selects 330. For example, if a computer of the destination system 180 has a particular operating system installed, the context system 210 may select 330 an advertisement of a compatible software application which may otherwise not be selected 330. In another embodiment, the past activities of the user may drive the selection 330. For example, cookies on a user's computer may indicate the user's preferences, which may be considered by the context system 210 in selecting 330 the supplemental content to be presented 340 to the user.

In one embodiment, the context system 210 selects 330 the supplemental content based at least in part on statistical data of other users' activity. Supplemental content successful in similar context in the past (e.g., an advertisement with high click rate) tends to remain successful in the near future. Therefore, the context system 210 may select 330 the supplemental content with favorable statistical data over the unfavorable ones, thus increasing the effectiveness of the selected supplemental content. In one embodiment, the context system 210 can use algorithms such as the Bayesian inference to determine a success score for candidate supplemental content items, and select 330 the one with the highest score.

In one embodiment, the context system 210 implements the function for selecting 330 supplemental content as a rule engine. The rule engine may include rules that correspond to logics (or algorithms) the context system 210 uses to conduct the selection 330. The rules may be provided by parties of interest. A rule may be based on content-related context information. For example, a rule may be to select 330 an airline advertisement whenever a program contains the word "Hawaii" two or more times in a media stream. The matching (or filtering) of the words may be literal (e.g., "Cadillac" should trigger content associated with "Cadillac") or associative (e.g., the word "basketball" may be associated with content related to sneakers and other shoes). As another example, a user may set a rule that prohibits the selection 330 of any advertisement for a media program about jewelry. A rule may be based on usage-related context information. For example, an advertiser may set a rule that prohibits the selection 330 of its advertisements when the destination system 180 uses a cellular phone to present 340 the supplemental content. The rules engine thus allows for any rule or combination of rules for the context system 210 to select 330 supplemental content from the collection of context information.

In one embodiment, after selecting 330 the supplemental content, the context system 210 selects a format for the selected supplemental content. The supplemental content may have multiple formats, each of which may be presented differently based on the destination system 180. For example, an advertisement for a particular product may have a video format having a high-resolution video version and a low-resolution version, an audio format for radio listeners, and a web format having an URL pointing to a web page designated to promote the product.

The context system 210 may select a format for the supplemental content based on the context information. A number of factors may be considered in selecting the format of the supplemental content, such as the location of the user, the configuration of the destination system 180, and the format of the media stream. For example, if the user placeshifts video stream from home and views the stream using a laptop computer, the context system 210 may select a shortened low-resolution format of the selected supplemental content. However, if the viewer is watching the same video stream at home using a large screen high-definition television (HDTV), the context system 210 will select a format that can deliver full-length high-resolution of the selected supplemental content on the HDTV. If the context system 210 discovers that the user is watching the same video stream using a mobile wireless device (e.g., a smart phone), it may select an abbreviated format that will be displayed as a scrollbar in the device.

In one embodiment, the context system 210 implements the function for selecting a format for the supplement content using the same rule engine as the one for the function for selecting 330 the supplemental content. Parties of interests (e.g., users or advertisers) may add or modify rules to set their preferences. For example, some advertisers may prefer their advertisements to be in a particular format (e.g., text only), while other advertisers may prefer to display their advertisement together with the media stream and launch a particular web page for the viewers to visit.

In one embodiment, the selection 330 of the supplemental content is conducted by the destination system 180. The context system 210 may send (or transmit) the determined context information to the destination system 180. The destination system 180 may make the selection 330 in manners similar to the ones described above.

Presenting the Supplemental Content

Once the supplemental content is selected 330, the supplemental content and the media stream are presented 340 to users via the destination system 180. In one embodiment, the context system 210 sends (or transmits) the media stream and the supplemental content to the destination system 180 using the same communication channel 230. The supplemental content may accompany the media stream synchronously or asynchronously.

Depending on the formats of the media stream and the supplemental content, the context system 210 may incorporate the supplemental content into the media stream to form a new combined media stream and send the combined stream to the destination system 180. For example, if both the media stream and the supplemental content include video content, the context system 210 may add video content of the supplemental content in front of the video content of the media stream (pre-placement), at the end of the video content of the media stream (post-placement), or above the video content of the media stream (overlay). Alternatively, the supplemental content may be delivered in a different channel and/or by completely different delivery means than the media stream. For example, while the media stream may be sent to the destination system 180 through a computer network, the context system 210 may send 340 the supplemental content offline. For example, the supplemental content may be sent 340 through a phone call, a fax, or the postal service to the user's home. The destination system 180 may combine (or incorporate) the supplemental content and the media stream to present 340 them to the users.

In one embodiment, the supplemental content is stored in the destination system 180 or in a storage device accessible by the destination system 180. Rather than sending the supplemental content to the destination system 180, the context system 210 may send information necessary for the destination system 180 to access the supplemental information. For example, the destination system 180 may have certain advertisements stored in its local storage. Rather than sending an advertisement to the destination system 180, the context system 210 may send an identifier that uniquely identifies the advertisement in the local storage. As another example, the context system 210 may send a uniform resource locator (URL) associated with the supplemental content to the destination system 180, which may then retrieve the supplemental content using the URL through a network. Beneficially, this approach alleviates much of the need for transmission of supplemental content from the context system 210 to the destination system 180.

In one embodiment, the context system 210 only sends the supplemental content to the destination system 180 and not the media stream. In another embodiment, the context system 210 stores (or caches) the media stream and the supplemental content in a local storage device and sends the media stream along with the supplemental content to the destination system 180 at a later time. For example, the context system 210 may also function as a time-shifting or placeshifting device. The context system 210 may include personal video recorder functionality (using local storage to record the media stream received) and tag the recorded media stream with information indicating the content of the programs recorded. On play back, this information can be used to select supplemental content such as context-relevant advertisements and information.

Depending on the format of the supplemental content, the format of the media stream, and/or the configuration of the destination system 180, the destination system 180 may present 340 the supplemental content to the users in a variety of ways. The destination system 180 may present 340 the supplemental content using the same output device as the one used to present 340 the media stream. For example, the destination system 180 may display both the supplemental content and the media stream in the same screen. The supplemental content and the media stream may also be presented 340 using the same application. For example, the destination system 180 may display a television program (media stream) using a media player, and overlay an advertisement (supplemental content) as a scrollbar (or text ticker) on the television program using the media player. Alternatively, the supplemental content and the media stream may be presented 340 using different applications. For example, if the supplemental content includes a URL, the destination system 180 may launch a web browser to display the web page associated with the URL, while displaying the media stream using a media player. One example of the media player is described in more detail in U.S. patent application Ser. No. 11/147,664, filed on Jun. 7, 2005, the content of which are hereby incorporated by reference.

The destination system 180 may present 340 the supplemental content and the media stream using different output devices. For example, the destination system 180 may present 340 a television program (media stream) on a HDTV and print a coupon (supplemental content) using an associated printer.

In one embodiment, the destination system 180 and/or the context system 210 replaces a portion of the media stream with the supplemental content. For example, the destination system 180 may replace an advertisement for a company with a different advertisement for the company that is determined to be more relevant to the user.

Example Process

The process described above can be further illustrated through an example of an operation of the context system 210 in accordance with one embodiment of the invention. In this example, a user is watching a television broadcast of a baseball game using a personal computer through a placeshifting device.

While receiving the television broadcast from a television station, the place shifting device determines that a particular baseball player is at bat. Based on this information, the placeshifting device selects an advertisement for a website that sells sports memorabilia. To do this, the placeshifting device may select a URL for a web page on the website where the viewer can buy an autographed ball from the baseball player that is currently at bat. This selection may also be based in part on information that is not determined from the media stream, such as the user's previously stated preferences or activity (e.g., the user has visited websites that have this player's stats, thus indicating an interest in the player). This supplemental content is then delivered to the user's personal computer with the television broadcasting. As a result, while the user is watching his favorite player at bat during a baseball game on the personal computer, the user also receives an advertisement for the relevant sports memorabilia as well as a link to a web page where the user can easily buy the advertised product.

Advertisement Marketplace Business Model

The systems and methods described above enable a business model in which third parties can register advertising or supplemental content and specify the criteria that trigger it. Context, as defined above, may play a large part in those criteria. The third parties' criteria are used, at least in part, to select the supplemental content to be presented with the media stream. When a third party's advertisement is played, presented or interacted with, the third party is charged a fee. The amount charged may be based on the number of times the advertisement is selected and added to a media stream, for each viewer. In one embodiment, the service includes a web interface for third parties to upload their advertisements or other supplemental content and select or define the criteria to be applied for pairing the supplemental content with the media content presented to viewers.

The service may also allow the third parties to bid amounts of money on certain criteria, where the bid amount is or is related to the price that the third party is charged for the presenting of its content with the media stream. The system may then give priority to third parties' content based on the associated bid amount. This enables an efficient marketplace for advertisements, where prices adapt to a market price for various criteria and content based on demand.

In another aspect of an embodiment of this model, the service that pairs the supplemental content with the original television or video content can be independent from all the primary and secondary content providers. The technologies used to determining context while transporting primary media may serve as a matchmaking virtual marketplace for third parties interested in delivering their supplemental information to a particular set of users. In addition, the transport providers (e.g., the carriers and others) might be included in this model in a variety of ways based on the type of content presented to the user.

In one example of this, an advertising agency may wish to place one million dollars of advertising on computers and mobile devices for its client. By bidding on keywords (skateboard, motocross, etc), genres (for example: sports::extreme) and indicating that it wants to place video content on computers and mobile devices, a spend plan is built around the budget using the service described above. Once buys are in place and confirmed, whenever a 19 year-old placeshifts the X-Games onto his cellular phone, the client is assured that a certain number of airings will include their video advertisement. Money paid by the client may be distributed in different percentages among the primary content owners, the service that enables this business, and the cellular phone carriers, all based upon the tracking data maintained by the enabling service.

The tracking information that can be maintained by the context/content matching business includes performance metrics, including, but not limited to: (1) how often secondary content was presented to users; (2) how often they interacted with the secondary content; (3) where and when the secondary content was presented; (4) which primary content triggered the secondary content; and (5) which networks carried the secondary and primary content. Based on these metrics, the different parties involved can agree upon appropriate ways to split up the revenue stream.

Summary

Embodiments of the invention provide a system and method to pair media content with context-relevant supplemental content and present the media content and the supplemental content to a user.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings.

Some portions of above description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system or similar electronic computing device, which manipulates and transforms data represented as physical (electronic) quantities within the computer system memories or registers or other such information storage, transmission, or display devices.

Embodiments of the invention may also relate to an apparatus for performing the operations herein. This apparatus may be specially constructed for the required purposes, or it may comprise a general-purpose computing device selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium and modulated or otherwise encoded in a carrier wave transmitted according to any suitable transmission method.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, embodiments of the invention are not described with reference to any particular programming language. It is appreciated that a variety of programming languages may be used to implement various embodiments of the invention as described herein, and any references to specific languages are provided for disclosure of enablement and best mode of embodiments of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method executable by a data processing system, the method comprising:
    receiving a clip of media content from a first media player device at the data processing system, wherein the clip of media content is a clip extracted from a broadcast television program by a user of the first media player device;
    analyzing at least a portion of the received clip of media content by the data processing system to thereby automatically identify the broadcast television program from which the user-created clip originated, wherein the analyzed portion of the received clip comprises metadata that identifies the broadcast television program that is obtained from an electronic program guide (EPG) by the first media player device, and wherein the first media player device embeds the metadata obtained from the electronic program guide in the clip of media content for subsequent analysis by the data processing system;
    identifying supplemental content related to the identified clip of media content; and
    providing the identified clip of media content and the supplemental content over the network to a second media player device for presentation to a second user.

2. The method of claim 1 wherein the analyzing comprises analyzing the media content by the data processing system in real time as the dip of media content is received at the data processing system.

3. The method of claim 1, wherein the supplemental content comprises an advertisement.

4. A method executable by a data processing system that processes media content, the method comprising:
    receiving a clip of media content from a remotely-located media client device via a network, wherein the received clip comprises a portion of media content extracted from a broadcast television program by a user of the remotely-located media client device;
    analyzing at least a portion of the received clip of media content at the data processing system to automatically determine context-relevant information that identifies the broadcast television program from which the user extracted the clip, wherein the analyzed portion of the received clip comprises metadata that identifies the broadcast television program and that is obtained from an electronic program guide (EPG) by the remotely-located media client device, and wherein the remotely-located media client device embeds the metadata obtained from the electronic program guide in the clip of media content for subsequent analysis by the data processing system;
    processing the context information to thereby select supplemental content that is related to the identified content using the data processing system; and
    providing the supplemental content and the identified media content for presentation to a viewer of a second remotely-located client device via the network.

5. The method of claim 4 wherein the supplemental content is an advertisement.

6. The method of claim 4 wherein the supplemental content is an advertisement for a product, and wherein the product is related to the content of the clip extracted by the user.

7. The method of claim 4 wherein the supplemental content comprises an advertisement selected from a plurality of advertisements based upon the determined context information so that the selected advertisement advertises a product that is related to the clip of media content.

8. A data processing system comprising:
    an interface to a network; and
    a processor configured to receive a clip of media content from a remotely-located client device via the network, wherein the clip is extracted by a user of the remotely-client device from a broadcast television program, to analyze the received clip to thereby automatically identify the broadcast television program from which the clip was extracted, and to identify supplemental content related to the clip, and to provide the identified clip and the supplemental content to a second remotely-located client device via the network for presentation to a viewer, wherein the processor is further configured to analyze metadata contained in the received clip of media content that identifies the broadcast television program, and wherein the metadata is obtained from an electronic program guide (EPG) by the remotely-located client device, and wherein the remotely-located client device embeds the metadata obtained from the electronic program guide in the clip of media content for subsequent analysis by the data processing system.

9. The data processing system of claim 8 wherein the remotely-located client device obtains the broadcast television program as a placeshifted media stream from a placeshifting device, and wherein the remotely-located client device extracts the clip from the placeshifted media stream based upon inputs received from the user of the remotely-located client device that define a beginning and an end of the placeshifted media stream.

* * * * *